United States Patent Office 3,356,685
Patented Dec. 5, 1967

3,356,685
2-NITROBENZIMIDAZOLES
Alden Gamaliel Beaman, North Caldwell, and Robert Duschinsky, Essex Fells, N.J., and William Paul Tautz, New York, N.Y., assignors to Hoffmann-La Roche Inc., Nutley, N.J., a corporation of New Jersey
No Drawing. Filed Nov. 17, 1964, Ser. No. 411,694
8 Claims. (Cl. 260—309.2)

ABSTRACT OF THE DISCLOSURE 2-nitrobenzimidazole and analogs having antimicrobial properties are prepared by treating 2-aminobenzimidazole with an alkali metal nitrite preferably in the presence of a water soluble copper salt.

---

The present invention relates to benzimidazoles and more particularly relates to 2-nitrobenzimidazoles and to processes for their preparation.

The novel compounds of the invention have the formula

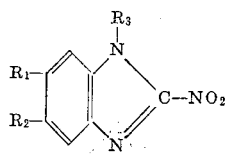

(I)

wherein $R_1$ and $R_2$ are hydrogen or lower alkyl and $R_3$ is hydrogen, lower alkyl, or hydroxy lower alkyl.

Included within the scope of the invention are salts of the compounds of Formula I when $R_3$ is hydrogen with pharmaceutically acceptable strong bases, e.g. alkali and alkaline-earth metal hydroxides, etc., pharmaceutically acceptable strong bases, e.g. ethanolamine, primary-, secondary- and tertiary-alkyl amines, etc.

The term "lower alkyl" used in the specification is to be understood to mean a straight or branched chain $C_1$–$C_7$ alkyl group, e.g., methyl, ethyl, propyl, butyl, isobutyl, hexyl, etc., with methyl preferred.

The term "hydroxy lower alkyl" is to be understood to mean a monohydroxy lower alkyl group, and is preferably β-hydroxyethyl.

The process of the invention is carried out by reacting a compound of the formula

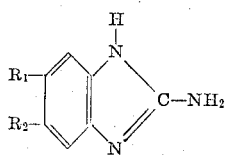

(II)

wherein $R_1$ and $R_2$ have the above meaning, or an acid addition salt thereof, e.g., a sulfate or nitrate salt, with an alkali metal nitrite, e.g., sodium or potassium nitrite, preferably in the presence of a water soluble copper salt, i.e., either a cupric or cuprous salt, e.g., cupric sulfate, cuprous nitrate, etc., with cupric sulfate preferred. The use of a copper salt results in a surprising increase in yield of product. Copper salts which contain an anion capable of replacing a diazonium group, e.g., the chloride ion, are preferably not employed in the process of the invention. The reaction medium is aqueous and should have a pH less than about 8. This can be achieved by the addition of a mineral acid, e.g., $H_2SO_4$, $HNO_3$, etc., or by employing an acid addition salt of the compound of Formula II. The above reaction results in the preparation of compounds of Formula III

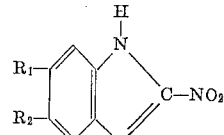

(III)

wherein $R_1$ and $R_2$ have the above meaning.

Compounds of the formula

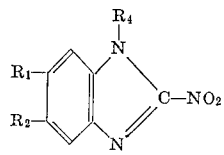

(IV)

wherein $R_1$ and $R_2$ have the above meaning and $R_4$ is lower alkyl or hydroxy lower alkyl, are formed by reacting a compound of Formula III or a derivative of a compound of Formula III wherein the hydrogen attached to the ring nitrogen atom is replaced by a metal from Groups IA, IB, IIA or IIB of the Periodic Table (Handbook of Chemistry and Physics, 35th edition, pages 392–3), with an alkylating or hydroxy alkylating agent. Alkylating and hydroxy alkylating agents that can be employed include the lower alkyl halides and hydroxy lower alkyl halides, lower alkyl sulfates, p-toluene sulfonates, etc.

Derivatives of Formula III wherein the hydrogen atom attached to the ring nitrogen atom is a metal are formed by standard techniques, e.g. dissolving a compound of Formula III in water, adjusting the pH with sodium hydroxide to about 7, and then adding an equivalent quantity of water soluble salt or base of the desired metal, e.g. silver nitrate, sodium hydroxide, etc. Of course, where the metal is bivalent two molecules of the compound of Formula III will be bonded to one molecule of the metal.

The novel compounds of Formulae I, III, and IV and their salts are active against protozoa, bacteria, and pathogenic yeasts; and are useful as germicides and as agents for the treatment of pathogenic yeast and protozoae infections, e.g., Trichomonas vaginalis, Histomonas maleagradis, etc. They can be administered orally, parenterally, or topically, e.g., in combination with the usual pharmaceutical adjuvants. Typical internal dosages range from about 20 to about 200 g./kg. animal body weight with dosage adjusted to species and individual requirements. Topical compositions contain concentrations of active ingredients of from about 0.1 mg. to about 1 mg. per gram of composition.

The invention will be better understood by referring to the following examples which are given for illustration purposes only and are not meant to limit the invention.

EXAMPLE 1

*Preparation of 2-nitrobenzimidazole*

13.3 g. (0.1 mole) of 2-aminobenzimidazole was suspended in 110 ml. of 1.0 N sulfuric acid with stirring. 25.0 grams (0.15 mole) of $CuSO_4 \cdot 5H_2O$ was added and the suspension was cooled to 0°. A solution of 34.5 grams (0.5 mole) of sodium nitrite in 100 ml. of water was added dropwise thereto over a period of 55 minutes. The pH of the mixture at this point was 4.1. The reaction mixture was allowed to stir at room temperature overnight for 18 hours.

33 ml. of 18 N sulfuric acid was then added dropwise with cooling and stirring (evolution of $NO_2$). The pH of the reaction mixture was 0.55. After stirring for 1½ hours at room temperature the suspension was extracted twice with 1000 ml. portions of ethyl acetate. The combined ethyl acetate extracts were dried with sodium sulfate, filtered and concentrated in vacuo to dryness.

The crude residue weighed 8.97 grams and melted at 225–226° with decomposition. Recrystallization, first from chlorobenzene, then from ethanol, gave 3 g. (18.5%) of analytically pure 2-nitrobenzimidazole melting at 261–262° with decomposition. The mother liquor, contained more product which was not isolated.

EXAMPLE 2

*Preparation of 5,6-dimethyl-2-nitrobenzimidazole*

16.1 grams (0.1 mole) of 2-amino-5,6-dimethylbenzimidazole was suspended in 100 ml. of 1.0 N sulfuric acid. 25.0 grams (0.1 mole) of $CuSO_4 \cdot 5H_2O$ was added with stirring and the mixture cooled to 0° C. A solution of 34.5 grams (0.5 mole) of sodium nitrite in 100 ml. of water was added dropwise over 50 minutes. After stirring overnight at room temperature, the reaction mixture was heated to 50–55° C. for 2½ hours. It was then cooled in ice and acidified to pH 0.5 by adding dropwise 33 ml. of 18 N sulfuric acid. The reaction mixture was then extracted with 500 ml. ethyl acetate. The organic phase was dried with sodium sulfate, filtered and concentrated to dryness in vacuo. The yield of crude 5,6-dimethyl-2-nitrobenzimidazole was 10.27 grams; melting point 224–226° with decomposition. Crystallization first from isopropanol, then from aqueous ethanol, gave pure product, melting point 244–245° C. (dec.).

EXAMPLE 3

*Preparation of 1-methyl-2-nitrobenzimidazole*

3.22 grams (0.0197 mole) of 2-nitrobenzimidazole was dissolved in a mixture of 10 ml. of 2.5 N NaOH and 20 ml. of water by heating to 55°. After heating was discontinued, 3.0 ml. of dimethyl sulfate was added dropwise with stirring. A thick, light yellow crystalline mass formed and the temperature of the mixture rose to 60°. Stirring was continued for 1½ hours at room temperature and the reaction mixture was allowed to stand overnight.

After diluting with 75 ml. of water and cooling in ice, the crystalline material was filtered off, washed with a little ice water and dried in vacuo. The yield of 1-methyl-2-nitrobenzimidazole was 3.38 grams (97.5%), melting point 162–163° C. Crystallization from dilute ethanol gave analytically pure product; melting point 166–168°.

EXAMPLE 4

*Preparation of 1-(β-hydroxyethyl)-2-nitrobenzimidazole*

Procedure A.—To a solution of 3.26 g. (0.02 mole) of 2-nitrobenzimidazole in 50 ml. aqueous concentrated ammonia there was added a solution of 5.1 g. of silver nitrate in 20 ml. water. A yellow precipitate of silver salt was formed, which was filtered off, washed with water and dried in vacuo at 80° yield 5.31 g. (99%). This salt was suspended in 28.3 g. (2.28 mole) of 2-bromoethanol and 170 ml. toluene and the suspension was refluxed for 16 hours. The reaction mixture was then evaporated to dryness in vacuo and the residue was extracted 6 times with 100 ml. of boiling water. The water extracts were acidified with hydrochloric acid and extracted with ethyl acetate. The ethyl acetate extract was evaporated to dryness. The residue was submitted to counter current distribution in a Craig machine. The lower layer was 1:1 mixure of concentrated aqueous ammonia and water and the upper layer butanol. The fractions showing an ultraviolet absorption peak at 285–286 mμ (in 0.1 N NaOH) and only a minimal optical density at the 370 mμ vicinity (ratio of optical densities of 285/370 being 20–40) were collected and gave upon evaporation 1-(β-hydroxyethyl)-2-nitrobenzimidazole.

Procedure B.—4.0 grams of 2-nitrobenzimidazole was added to a solution of 1.56 grams KOH in 30 ml. of methanol by gentle heating on the steam bath to form a clear yellow solution. Upon evaporation in vacuo the yellow potassium salt of 2-nitrobenzimidazole was obtained. This was suspended in 50 ml. of ethylene chlorohydrin. The mixture was distilled until the temperature reached the boiling point of ethylene chlorohydrin (127°) to drive off traces of methanol. It was then refluxed for 90 minutes.

After cooling the mixture was concentrated in vacuo and the resultant thick mass was diluted with 200 ml. of ethanol. Upon cooling in ice the potassium chloride which had separated was filtered off and was washed with small amounts of ethanol and ether. The combined filtrate and washings were evaporated to dryness in vacuo; yield of crude product=6.54 grams. The product can be purified as in Procedure A.

The 2-aminobenzimidazole starting materials of Formula II are prepared according to the procedure given by Hofmann, the Chemistry of Heterocyclic Compounds: Imidazole and Its Derivatives, Part I, page 309 (1953). In particular, the reaction is carried out by reacting cyanogen bromide with an o-phenylenediamine of the formula

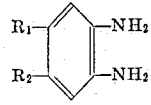

wherein $R_1$ and $R_2$ are hydrogen or lower alkyl, to form a compound of Formula II.

What is claimed is:

1. A compound of the formula

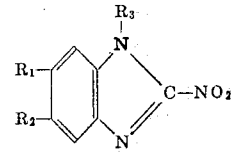

wherein $R_1$ and $R_2$ are selected from the group consisting of hydrogen and lower alkyl, and $R_3$ is selected from the group consisting of hydrogen, lower alkyl, and hydroxy lower alkyl.

2. A salt of the compound defined in claim 1 wherein $R_3$ is hydrogen with a pharmaceutically acceptable strong base.

3. 2-nitrobenzimidazole.

4. A salt of 2-nitrobenzimidazole with a pharmaceutically acceptable strong base.

5. 5,6-dimethyl-2-nitrobenzimidazole.

6. A salt of 5,6-dimethyl-2-nitrobenzimidazole with a pharmaceutically strong base.

7. 1-(β-hydroxyethyl)-2-nitrobenzimidazole.

8. 1-methyl-2-nitrobenzimidazole.

References Cited

UNITED STATES PATENTS 2,965,648   12/1960   Wiegand et al. _____ 260—309.2
3,103,518   9/1963    Duennenberger et al. _ 260—309.2
3,287,468   11/1966   Beaman et al. _____ 260—309

OTHER REFERENCES

Hodgson et al.: Jour. Soc. Dyers and Colourists, vol. 66, pp. 229–31 (1950).

Hodgson et al.: Jour. Chem. Soc. (London), 1948, pp. 1512–13.

Hodgson et al.: Jour. Chem Soc. (London), 1949, pp. 1624–25.

Rabinowitz et al.: Jour. Amer. Chem. Soc., vol. 73, 3030–37 (1951).

Wagner et al.: Synthetic Organic Chemistry, pp. 749 and 772–3, New York, Wiley, 1953.

JOHN D. RANDOLPH, *Primary Examiner.*

WALTER MODANCE, *Examiner.*

N. TROUSOF, *Assistant Examiner.*